US012160620B2

(12) United States Patent
Zhong et al.

(10) Patent No.: US 12,160,620 B2
(45) Date of Patent: Dec. 3, 2024

(54) INFORMATION INTERACTION METHOD, APPARATUS AND DEVICE

(71) Applicant: Beijing Bytedance Network Technology Co., Ltd., Beijing (CN)

(72) Inventors: Ke Zhong, Beijing (CN); Kun Chang, Beijing (CN); Yijie Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/328,646

(22) Filed: Jun. 2, 2023

(65) Prior Publication Data

US 2023/0319325 A1    Oct. 5, 2023

Related U.S. Application Data

(63) Continuation of application No. PCT/CN2021/132191, filed on Nov. 22, 2021.

(30) Foreign Application Priority Data

Dec. 2, 2020  (CN) .......................... 202011402453.9

(51) Int. Cl.
*H04N 21/2187* (2011.01)
*H04N 21/4788* (2011.01)

(52) U.S. Cl.
CPC ..... *H04N 21/2187* (2013.01); *H04N 21/4788* (2013.01)

(58) Field of Classification Search
CPC ............ H04N 21/2187; H04N 21/4788; H04L 51/52; H04L 51/07; G06Q 30/0601–0643; G06Q 50/01
See application file for complete search history.

(56) References Cited

U.S. PATENT DOCUMENTS

2014/0258451 A1    9/2014  Harris et al.
2017/0116666 A1*   4/2017  Lawson ................. G06Q 20/06
(Continued)

FOREIGN PATENT DOCUMENTS

CN      108184131 A    6/2018
CN      111355974 A    6/2020
(Continued)

OTHER PUBLICATIONS

China National Intellectual Property Administration, International Search Report Issued in Application No. PCT/CN2021/132191, Feb. 18, 2022, WIPO, 13 pages.
(Continued)

*Primary Examiner* — Michael R Telan
(74) *Attorney, Agent, or Firm* — Alleman Hall & Tuttle LLP

(57) ABSTRACT

Embodiments of the present disclosure provide an information interaction method, an apparatus and a device. The method includes: displaying, by a second device, a first page corresponding to a first account, where the first page includes a first control; in response to a first operation on the first control, sending, by the second device, first prompt information to a first device corresponding to the first account, and updating the first control to a second control, where the first prompt information is used to prompt a user corresponding to the first account to update a creation; in response to a second operation on the second control, pre-transferring, by the second device, a first object to the first account, where the first object is transferred to the first account after the creation corresponding to the first account is updated. The reliability of live streaming interaction is improved.

17 Claims, 9 Drawing Sheets

(56) References Cited

U.S. PATENT DOCUMENTS

2018/0124477 A1* 5/2018 Qu .................. H04N 21/8547
2019/0268662 A1* 8/2019 Payzer ............. H04N 21/25891
2020/0234339 A1* 7/2020 McGrath ............... G06Q 50/01
2022/0005078 A1* 1/2022 Kim .................. G06Q 30/0273

FOREIGN PATENT DOCUMENTS

| CN | 111523039 A | 8/2020 |
| CN | 111935496 | 11/2020 |
| JP | 2020170283 A | 10/2020 |
| JP | 2022507484 A | 1/2022 |
| WO | 2017103685 A1 | 6/2017 |

OTHER PUBLICATIONS

European Patent Office, Extended European Search Report Issued in Application No. 21899898.7, Apr. 11, 2024, Germany, 9 pages.
Japan Patent Office, Office Action Issued in Application No. 2023533711, Sep. 17, 2024, 4 pages.

* cited by examiner

INFORMATION INTERACTION METHOD, APPARATUS AND DEVICE

CROSS-REFERENCES TO RELATED APPLICATIONS

The present disclosure is a continuation of International Application No. PCT/CN2021/132191, filed on Nov. 22, 2021, which claims priority to China Patent Application No. 202011402453.9, filed on Dec. 2, 2020 and entitled "Information Interaction Method, Apparatus and Device". The content of the above applications are hereby incorporated by reference in their entireties.

TECHNICAL FIELD

Embodiments of the present disclosure relate to the field of computer and network communication technologies and, in particular, to an information interaction method, an apparatus and a device.

BACKGROUND

A terminal device (such as a mobile phone, a computer and other devices) can be installed with live streaming software, and a user can live stream through the live streaming software.

The user can register an account through the live streaming software, and can watch creations posted by users (streamers) corresponding to other accounts through the terminal device. The creations may include short videos and live streams. If the user is interested in a creation posted by a streamer, the user can urge the streamer to post a new creation in time. In the related art, the user (a follower) can send a reminder message to the streamer through a comment to remind the streamer to update the creation. However, in the above process, if the streamer receives a large number of comments, the streamer cannot accurately acquire the reminder message from the follower, and cannot update the creation in time according to the reminder message, resulting in relatively low reliability of live streaming interaction.

SUMMARY

Embodiments of the present disclosure provide an information interaction method and a device to overcome a problem of relatively low reliability of live streaming interaction.

In a first aspect, an embodiment of the present disclosure provides an information interaction method, including:
  displaying, by a second device, a first page corresponding to a first account, where the first page includes a first control;
  in response to a first operation on the first control, sending, by the second device, first prompt information to a first device corresponding to the first account, and updating the first control to a second control, where the first prompt information is used to prompt a user corresponding to the first account to update a creation;
  in response to a second operation on the second control, pre-transferring, by the second device, a first object to the first account, where the first object is transferred to the first account after the creation corresponding to the first account is updated.

In a second aspect, an embodiment of the present disclosure provides an information interaction method, including:
  acquiring, by a first device, the amount of received first prompt information corresponding to a first account, where the first prompt information is used to prompt a user corresponding to the first account to update a creation;
  determining, by the first device, a first object pre-transferred to the first account;
  determining, by the first device, update request information according to the amount of the first prompt information and the first object, where the update request information includes the amount of the first prompt information and/or the first object;
  displaying, by the first device, the update request information.

In a third aspect, an embodiment of the present disclosure provides an information interaction apparatus, including a display unit, a sending unit and a pre-transfer unit, where,
  the display unit is configured to display a first page corresponding to a first account, where the first page includes a first control;
  the sending unit is configured to, in response to a first operation on the first control, send first prompt information to a first device corresponding to the first account, and update the first control to a second control, where the first prompt information is used to prompt a user corresponding to the first account to update a creation;
  the pre-transfer unit is configured to, in response to a second operation on the second control, pre-transfer a first object to the first account, where the first object is transferred to the first account after the creation corresponding to the first account is updated.

In a fourth aspect, an embodiment of the present disclosure provides an information interaction apparatus, including a first acquisition unit, a first determination unit, a second determination unit and a display unit, where,
  the first acquisition unit is configured to acquire the amount of received first prompt information corresponding to a first account, where the first prompt information is used to prompt a user corresponding to the first account to update a creation;
  the first determination unit is configured to determine a first object pre-transferred to the first account;
  the second determination unit is configured to determine update request information according to the amount of the first prompt information and the first object, where the update request information includes the amount of the first prompt information and/or the first object;
  the display unit is used to display the update request information.

In a fifth aspect, an embodiment of the present disclosure provides an electronic device, including: at least one processor and a memory;
  the memory stores computer execution instructions;
  the at least one processor executes the computer execution instructions stored in the memory to cause the at least one processor to execute the information interaction method according to any one of the first aspect.

In a sixth aspect, an embodiment of the present disclosure provides an electronic device, including: at least one processor and a memory;
  the memory stores computer execution instructions;
  the at least one processor executes the computer execution instructions stored in the memory to cause the at least one processor to execute the information interaction method according to any one of the second aspect.

In a seventh aspect, an embodiment of the present disclosure provides a computer-readable storage medium, where the computer-readable storage medium stores computer execution instructions, and when a processor executes the computer execution instructions, the information interaction method according to any one of the first aspect is implemented.

In an eighth aspect, an embodiment of the present disclosure provides a computer-readable storage medium, where the computer-readable storage medium stores computer execution instructions, and when a processor executes the computer execution instructions, the information interaction method according to any one of the second aspect is implemented.

In a ninth aspect, an embodiment of the present disclosure provides a computer program product including a computer program, where the information interaction method according to any one of the first aspect is implemented when the computer program is executed by a processor.

In a tenth aspect, an embodiment of the present disclosure provides a computer program product including a computer program, where the information interaction method according to any one of the second aspect is implemented when the computer program is executed by a processor.

In an eleventh aspect, an embodiment of the present disclosure provides a computer program, where the information interaction method according to any one of the first aspect is implemented when the computer program is executed by a processor.

In a twelfth aspect, an embodiment of the present disclosure provides a computer program, where the information interaction method according to any one of the second aspect is implemented when the computer program is executed by a processor.

An information interaction method, an apparatus and a device are provided by the embodiments of the present disclosure. When a user needs to urge, through the second device, the user corresponding to the first account to update the creation, the user can perform an operation on the second device to cause the second device to display the first page corresponding to the first account, and the user can perform the first operation on the first control in the first page to cause the second device to send the first prompt information to the first device corresponding to the first account and update the first control to the second control. The user can further perform the second operation on the second control to cause the second device to pre-transfer the first object to the first account. In the above process, the user can conveniently urge the user corresponding to the first account to update the creation through the first control and the second control. Correspondingly, the user corresponding to the first account can conveniently check the urging from other users and the first objects pre-transferred by other users, and then quickly update the creation, so as to avoid the user corresponding to the first account from missing urging information from other users, thereby improving the reliability of live streaming interaction.

BRIEF DESCRIPTION OF DRAWINGS

In order to more clearly illustrate the technical solutions in embodiments of the present disclosure or in the related art, the following will briefly introduce the drawings required for describing the embodiments or the related art. Obviously, the drawings in the following description are some embodiments of the present disclosure. For those of ordinary skills in the art, other drawings can also be obtained based on these drawings without creative effort.

DESCRIPTION OF EMBODIMENTS

In order to make the purposes, technical solutions and advantages of embodiments of the present disclosure clearer, the technical solutions in the embodiments of the present disclosure will be described clearly and completely in conjunction with the accompanying drawings in the embodiments of the present disclosure. Obviously, the described embodiments are part of the embodiments of the present disclosure, but not all of the embodiments. Based on the embodiments in the present disclosure, all other embodiments obtained by those of ordinary skills in the art without creative effort belong to the protection scope of the present disclosure.

For ease of understanding, an application scenario to which embodiments of the present disclosure are applicable will be described first in conjunction with FIG. 1.

Figure 1:
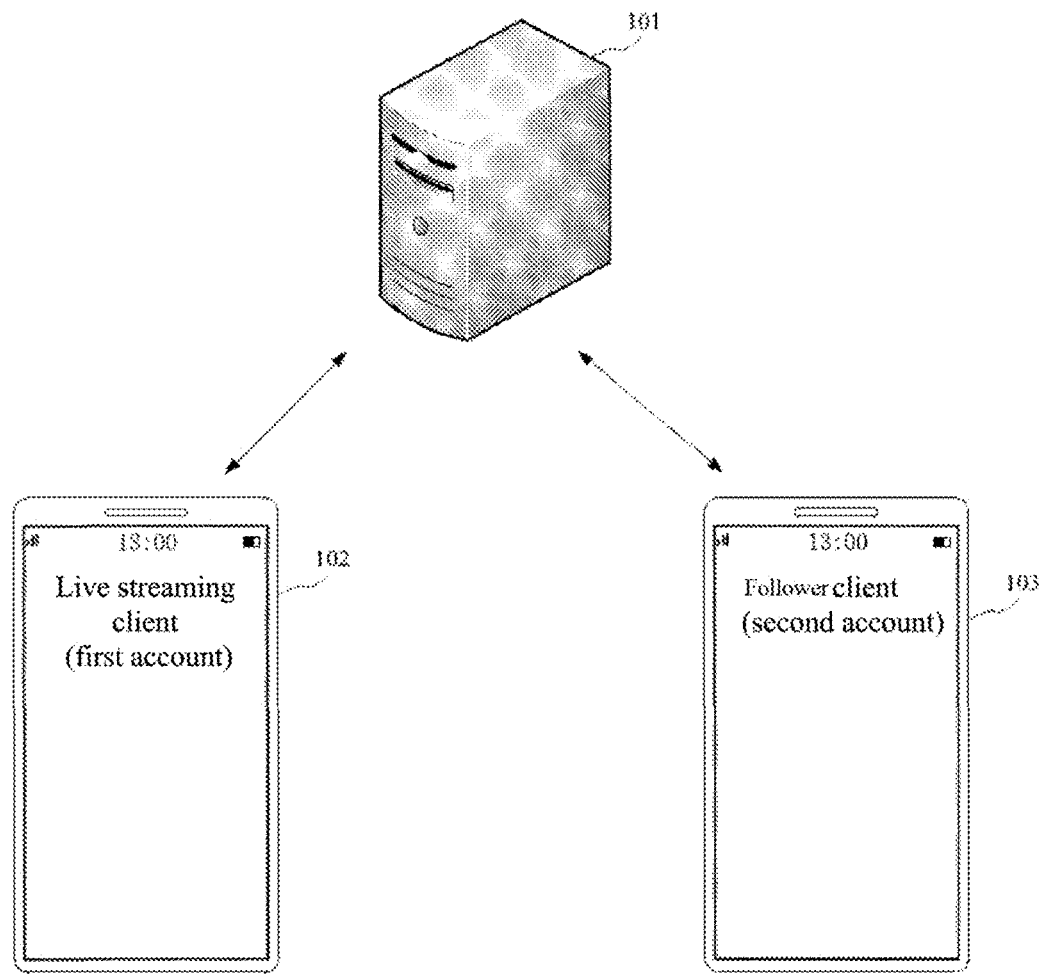
FIG. 1 is a schematic diagram of an application scenario provided by an embodiment of the present disclosure.

FIG. 1 is a schematic diagram of an application scenario provided by an embodiment of the present disclosure. Please refer to FIG. 1, which includes a live streaming client 102, a follower client 103 and a server 101. A live streaming application is set up in each of the live streaming client 102 and the follower client 103. A user (streamer) can live stream through the live streaming application in the live streaming client 102, and a user (follower) can watch live streaming content of the streamer through the live streaming application in the follower client 103. The server 101 may be a live streaming server, and the live streaming server can provide a live streaming service. For example, the live streaming server can forward the live streaming content of the live streaming client 102 to the follower client 103.

In the embodiments of the present disclosure, a function of urging a creation update (update-urging) can be added to the live streaming application, so that followers can conveniently urge the streamer to update the creation through the update-urging function in the live streaming application, and the streamer can conveniently check the urging from the followers through the update-urging function in the live streaming application. Further, during a process of urging the streamer to update the creation, the followers can also pre-transfer objects through the update-urging function, so that the streamer can quickly update the creation according to the urging from the followers and the pre-transferred objects, thereby improving the reliability of live streaming interaction.

Next, the technical solutions shown in the present application will be described in detail through specific embodiments. It should be noted that the following embodiments can exist independently or in combination with each other, and the same or similar content will not be repeated in different embodiments.

Figure 2:
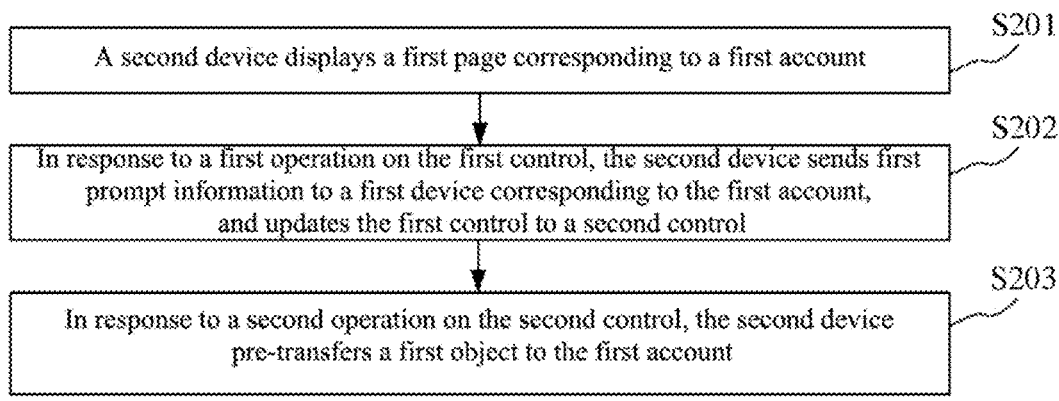
FIG. 2 is a schematic flowchart of an information interaction method provided by an embodiment of the present disclosure.

FIG. 2 is a schematic flowchart of an information interaction method provided by an embodiment of the present disclosure. Referring to FIG. 2, the method may include the following steps.

S201: a second device displays a first page corresponding to a first account.

The second device is installed with a live streaming application, and a user can log in to the live streaming application of the second device with a second account.

The first account is an account to be urged by the user to update a creation. When the user needs to urge a user corresponding to the first account to update the creation through the live streaming application, the user can operate the live streaming application in the second device to cause the second device to display the first page corresponding to the first account. The first page may be a home page corresponding to the first account.

The first page includes a first control, and the first control is an update urging control. The user can perform a click operation on the first control to trigger to urge the user corresponding to the first account to update the creation. The creation may include a live stream, a short video, an article, etc.

S202: in response to a first operation on the first control, the second device sends first prompt information to a first device corresponding to the first account, and updates the first control to a second control.

The first device is installed with a live streaming application, and an account for logging in to the live streaming application on the first device is the first account.

The first operation may be a click operation on the first control by the user. After the user performs the click operation on the first control, the second device can send the first prompt information to the first device, and prompt the user corresponding to the first account to update the creation through the first prompt information. The second device can further update the first control to the second control to indicate that the user has urged the user corresponding to the first account to update the creation.

In an implementation, the second device sends an update request to a server, where the update request includes the first account, so that the server sends the first prompt information to the first device according to the first account.

S203: in response to a second operation on the second control, the second device pre-transfers a first object to the first account.

The second device can pre-transfer the first object in the second account to the first account, where the first object may be a virtual resource. Pre-transfer refers to deducting the first object from the second account first, caching the first object in the server, and transferring the first object to the first account after the creation corresponding to the first account is updated. If the creation corresponding to the first account is not updated within a preset time period, the first object can be returned to the second account.

The second device may pre-transfer the first object to the first account in the following manners: in response to a click operation inputted to the second control, the second device displays an object detail page, and in response to a click operation on a sending control corresponding to the first object, the second device pre-transfers the first object to the first account. The object detail page includes an identifier of at least one object and a sending control corresponding to each object, and at least one object includes the first object.

In the above process, when the user needs to pre-transfer the first object to the first account, the user can perform the click operation on the second control to cause the second device to display the object detail page, and the user performs the click operation on the sending control corresponding to the first object in the object detail page to cause the second device to pre-transfer the first object to the first account.

Before the second device displays the object detail page, the second device needs to generate the object detail page first. For example, the second device can send an object information acquisition request to the server and receive object information sent by the server, and the second device can generate the object detail page according to the object information. In this way, after the object information in the server is updated, the second device can obtain the latest object information in time, so that the object information in the object detail page is the latest object information.

When the second device pre-transfers the first object to the first account, the second device can send an object transfer request to the server. The object transfer request includes an identifier of the first object, and the object transfer request is used to request the server to transfer the first object in the second account to the first account after the creation corresponding to the first account is updated. Accordingly, after the server receives the object transfer request, the server can cache the first object first, and after the server determines that the creation corresponding to the first account is updated, the server transfers the first object from the second account to the first account. If the creation corresponding to the first account is not updated within a preset time period, the server returns the first object to the second account.

After the second device pre-transfers the first object to the first account, the second device can update the second control in the first page to a third control, where the third control is used to indicate that the user corresponding to the first account has been successfully urged to update the creation.

In the embodiment shown in FIG. 2, when the user needs to urge the user corresponding to the first account to update the creation through the second device, the user can perform an operation on the second device to cause the second device to display the first page corresponding to the first account, and the user can perform the first operation on the first control in the first page to cause the second device to send the first prompt information to the first device corresponding to the first account and update the first control to the second control. The user can further perform the second operation on the second control to cause the second device to pre-transfer the first object to the first account. In the above process, the user can conveniently urge the user corresponding to the first account to update the creation through the first control and the second control. Correspondingly, the user corresponding to the first account can conveniently check the urging from other users and the first objects pre-transferred by other users, and then quickly update the creation, so as to avoid the user corresponding to the first account from missing urging information from other users, thereby improving the reliability of live streaming interaction.

Next, with reference to FIG. 3, the information interaction method shown in the embodiment of FIG. 2 will be described in detail through specific examples.

Figure 3:
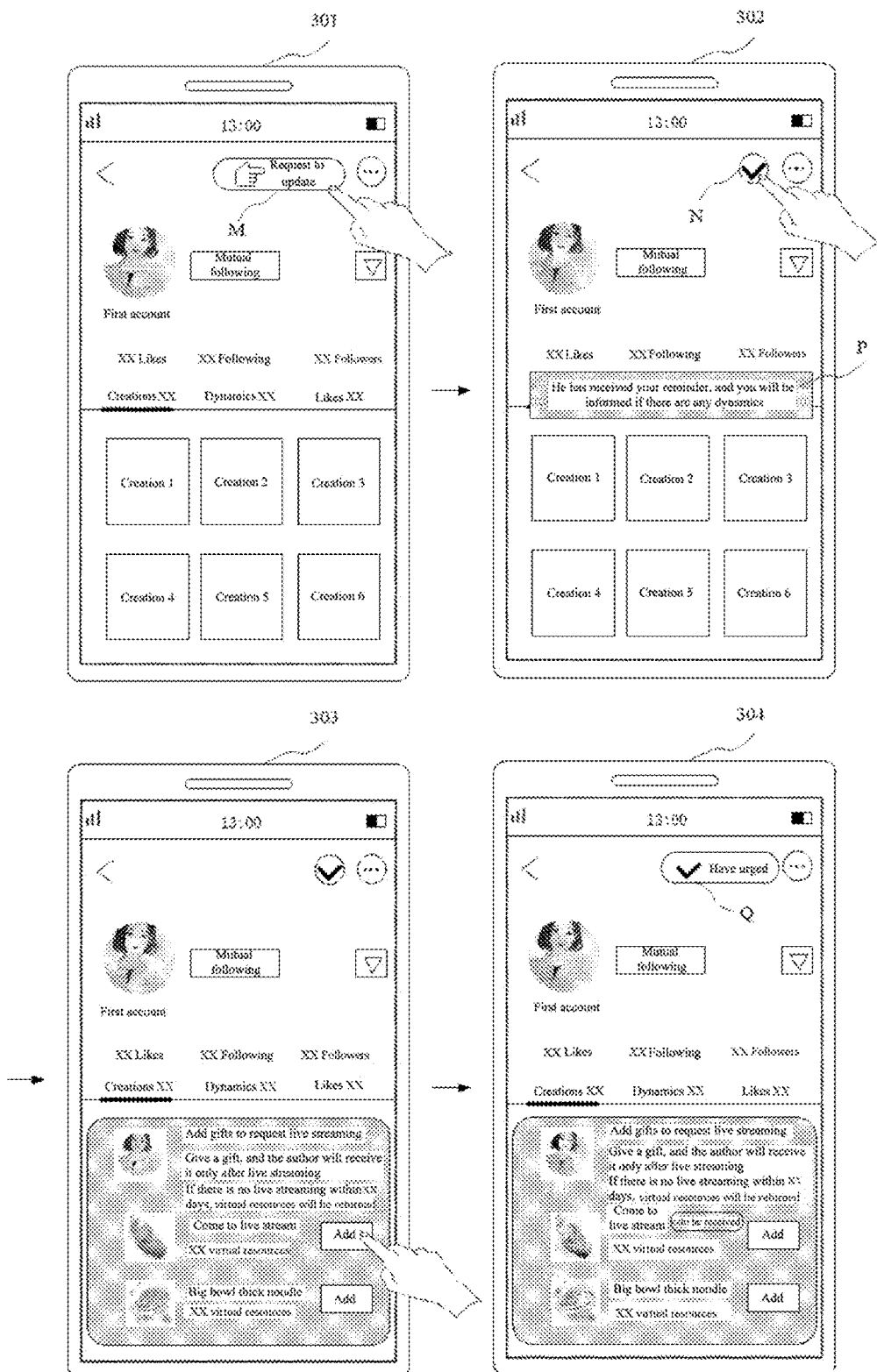
FIG. 3 is a schematic diagram of a terminal interface provided by an embodiment of the present disclosure.

FIG. 3 is a schematic diagram of a terminal interface provided by an embodiment of the present disclosure. Please refer to FIG. 3, which includes interfaces 301 to 304.

Please refer to the interface 301. A mobile phone 1 of a user is installed with a live streaming application, and the user can log in to the live streaming application with a second account. When the user needs to urge a user corresponding to a first account to live stream, the user can operate the live streaming application in the mobile phone 1 to cause the mobile phone 1 to display a home page corresponding to the first account, as shown in the interface 301. The interface 301 includes a "Request to update" control M (corresponding to the first control shown in the embodiment of FIG. 2), and the user can perform a click operation on the "Request to update" control M. After the mobile phone 1 receives the click operation inputted by the user, the mobile phone 1 sends an update request to a server, and the update request includes the first account. After the server receives the update request, the server sends first prompt information to a mobile phone 2 corresponding to the first account. After the server sends the first prompt information to the mobile phone 2, the server may further send a response message to the mobile phone 1. The response message is used to indicate that the server has successfully sent the first prompt information to the mobile phone 2. After the mobile phone 1 receives the response message, the mobile phone 1 can display a prompt box. For details, please refer to the interface 302. After the user performs the click operation on the "Request to update" control M, the mobile phone 1 also updates the "Request to update" control M to a "Checkmark" control N (corresponding to the second control in the embodiment of FIG. 2). For details, please refer to the interface 302.

Please refer to the interface 302. After the mobile phone 1 receives the response message, the mobile phone 1 can display the prompt box, in which the text "He has received your reminder, and you will be informed if there are any dynamics" is displayed. According to the text in the prompt box, the user can know that he/her has successfully reminded the user corresponding to the first account. After the user performs the click operation on the "Request to update" control M, the mobile phone 1 also updates the "Request to update" control M to the "Checkmark" control N. The user can perform a click operation on the "Checkmark" control N to add a gift to the first account. After the user clicks the "Checkmark" control N, the mobile phone 1 requests the server to obtain the latest gift information, and displays a gift adding interface (corresponding to the object detail page in the embodiment of FIG. 2) according to the latest gift information. For details, please refer to the interface 303.

Please refer to the interface 303. The mobile phone 1 displays the gift adding interface, and the gift adding interface includes multiple gifts and an "Add" control (corresponding to the sending control in the embodiment of FIG. 2) corresponding to each gift. When the user wants to add a gift, a click operation on the "Add" control corresponding to the gift can be performed to send the gift to the first account. For example, assuming that the user needs to add a "Come to live stream" gift, the user can perform a click operation on the "Add" control corresponding to the "Come to live stream" gift. After the mobile phone 1 receives the click operation, the mobile phone 1 sends a gift transfer request (corresponding to the object transfer request in the embodiment of FIG. 2) to the server, and the gift transfer request includes an identifier of the "Come to live stream" gift, so that the server deducts a virtual resource corresponding to the "Come to live stream" gift in the second account, caches the virtual resource on the server, and transfers the virtual resource to the first account after the first account starts to live stream. After the user adds the gift to the first account, the "Checkmark" control can be updated. For details, please refer to the interface 304.

Please refer to the interface 304. After the user adds the gift to the first account, the "Checkmark" control is updated to a "Checkmark Have urged" control. In the interface 304, the gift adding interface is also displayed. The gift adding interface displays gifts that the user has added to the first account and the quantity thereof, and the user can continue to add a gift to the first account.

It should be noted that in an actual application process, the user may also only perform the click operation on the "Request to update" control to urge a streamer to update. That is, in the above process, the user may also not pre-transfer the gift to the streamer.

In the above process, when the user needs to urge the user corresponding to the first account to live stream, the user can control the mobile phone to display the home page corresponding to the first account, and perform the click operation on the "Request to update" control in the home page, so that the mobile phone sends the prompt information to the mobile phone corresponding to the first account to prompt the user corresponding to the first account to update the creation. The streamer can conveniently check information about other users who urge him/her to live stream and the pre-transferred gifts in the home page corresponding to the first account, so as to avoid the streamer from missing the urging information, thereby improving the reliability of live streaming interaction.

On the basis of any one of the above embodiments, in an implementation, after the user urges the user corresponding to the first account to update the creation through the second device, if the creation corresponding to the first account is updated, the second device receives second prompt information, where the second prompt information includes a link of the first account and copywriting information, and the copywriting information is used to indicate that the creation corresponding to the first account is updated under urging from the second account. Next, the second prompt information will be described with reference to FIG. 4.

Figure 4:
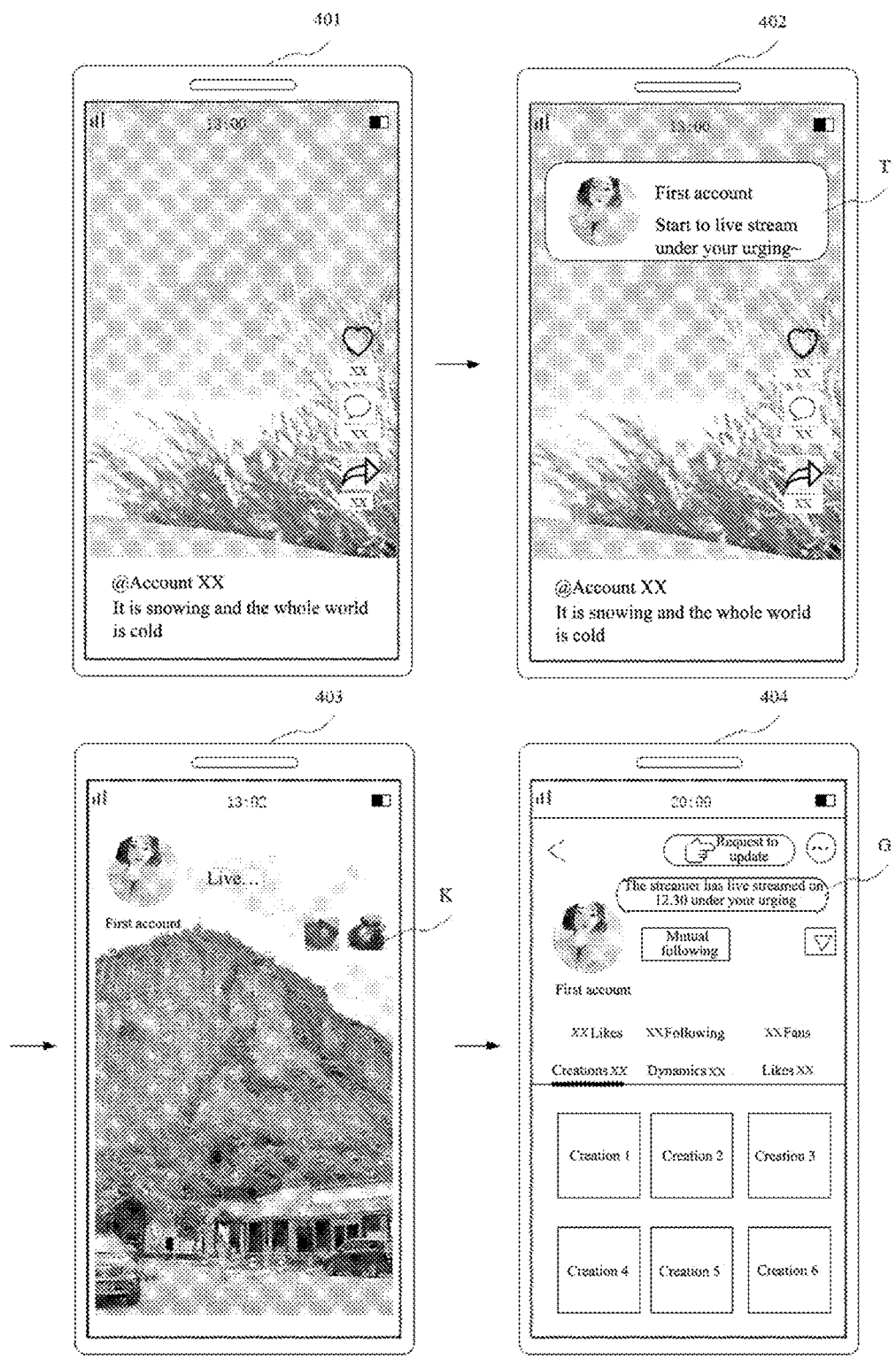
FIG. 4 is a schematic diagram of an interface for displaying second prompt information provided by an embodiment of the present disclosure.

FIG. 4 is a schematic diagram of an interface for displaying second prompt information provided by an embodiment of the present disclosure. Please refer to FIG. 4, which includes interfaces 401 to 404.

Please refer to the interface 401. A mobile phone displays an interface of a live streaming application currently, and the live streaming application is currently logged in to with a second account. If a user urged a first account to live stream through the second account before the current time, the mobile phone can receive second prompt information T after the first account live streams, and the mobile phone displays the interface 402.

Please refer to the interface 402. The mobile phone displays the second prompt information T, and the second prompt information T includes a link of the first account and copywriting information (Start to live stream under your urging~). If the user wants to watch the live streaming corresponding to the first account, the user can click the link of the first account, and the mobile phone can display a live streaming page corresponding to the first account. For details, please refer to the interface 403.

Please refer to the interface 403. The mobile phone displays the live streaming page corresponding to the first account, and the live streaming page includes an icon K of a gift that the user pre-transfers to the first account through the second account. After the first account starts to live stream, a user corresponding to the first account can receive the gift pre-transferred by the user. After the live streaming of the first account ends, if the user views a home page corresponding to the first account, it is prompted in the home page that the streamer has live streamed. For details, please refer to the interface 404.

Please refer to the interface 404. After the mobile phone displays the home page corresponding to the first account, prompt information "The streamer has live streamed on 12.30 under your urging" is displayed in the home page.

In the above process, after a follower urges the streamer to live stream, a follower client (a mobile phone used by the follower) can receive the second prompt information after the streamer starts to live steam, so that the follower can quickly access the live streaming interface of the streamer according to the second prompt information, and the pre-transferred gift can also be seen on the live streaming interface. After the live streaming ends, when the follower check the home page of the streamer, the main interface includes the prompt information, which prompts that the streamer has live streamed under urging, thereby making interaction between followers and the streamer stronger.

On the basis of any of the above embodiments, in an implementation, after the user urges the user corresponding to the first account to update the creation, if the user corresponding to the first account updates a short video, a server preferentially pushes the updated short video to the second device used by the user in a process of the user using the live streaming application, and adds an identifier to the short video to indicate that the short video is the creation whose update is requested by the user. Next, an interface of a short video will be described with reference to FIG. 5.

Figure 5:
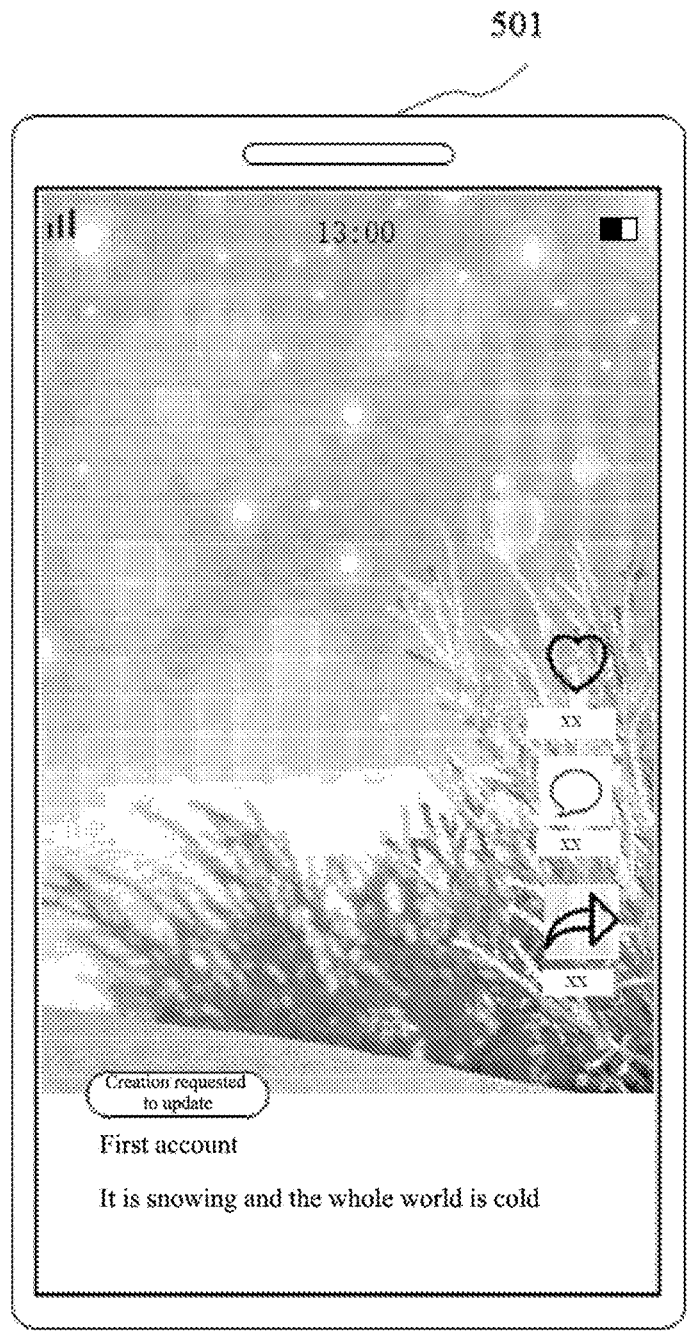
FIG. 5 is a schematic diagram of an interface of a short video provided by an embodiment of the present disclosure.

FIG. 5 is a schematic diagram of an interface of a short video provided by an embodiment of the present disclosure. Please refer to FIG. 5, which includes an interface 501.

Please refer to the interface 501. Assuming that the user has previously urged the user corresponding to the first account to update the creation, and that the user corresponding to the first account has updated the short video, after the user starts the live streaming application in the mobile phone, the mobile phone receives the updated short video sent by the server, and adds an identifier "Creation requested to update" to the short video.

In the above process, the server preferentially pushes the short video that the user requests to update to the second device, so that the user can quickly watch the short video that the user requests to update, improving the user experience. Further, the identifier is added to the short video to indicate that the short video is the creation whose update is requested, which can allow the user to quickly identify the type of the short video and make the interaction between followers and the streamer stronger.

On the basis of any of the above embodiments, in an implementation, the user can also check whether there are followers urging him/her to update a creation. Specifically, the second device displays a second page corresponding to the second account, and the second page includes a fourth control. In response to a click operation on the fourth control, the second device displays a third page, where the third page includes urged information, and the urged information includes an urging account and an urging time corresponding to the urging account. The second page may be a home page corresponding to the second account, and the second account is the user's own account.

In an implementation, if the second account does not receive any urging information, the urged information may not include any content, or prompt information is displayed to prompt that there are no followers asking for update recently. In an implementation, the third page also includes an urging record control. After the user clicks the urging record control, the second device can display records of urging other accounts through the second account.

Next, with reference to FIG. 6, a process of checking whether there are followers urging one to update one's creation will be described in detail through specific examples.

Figure 6:
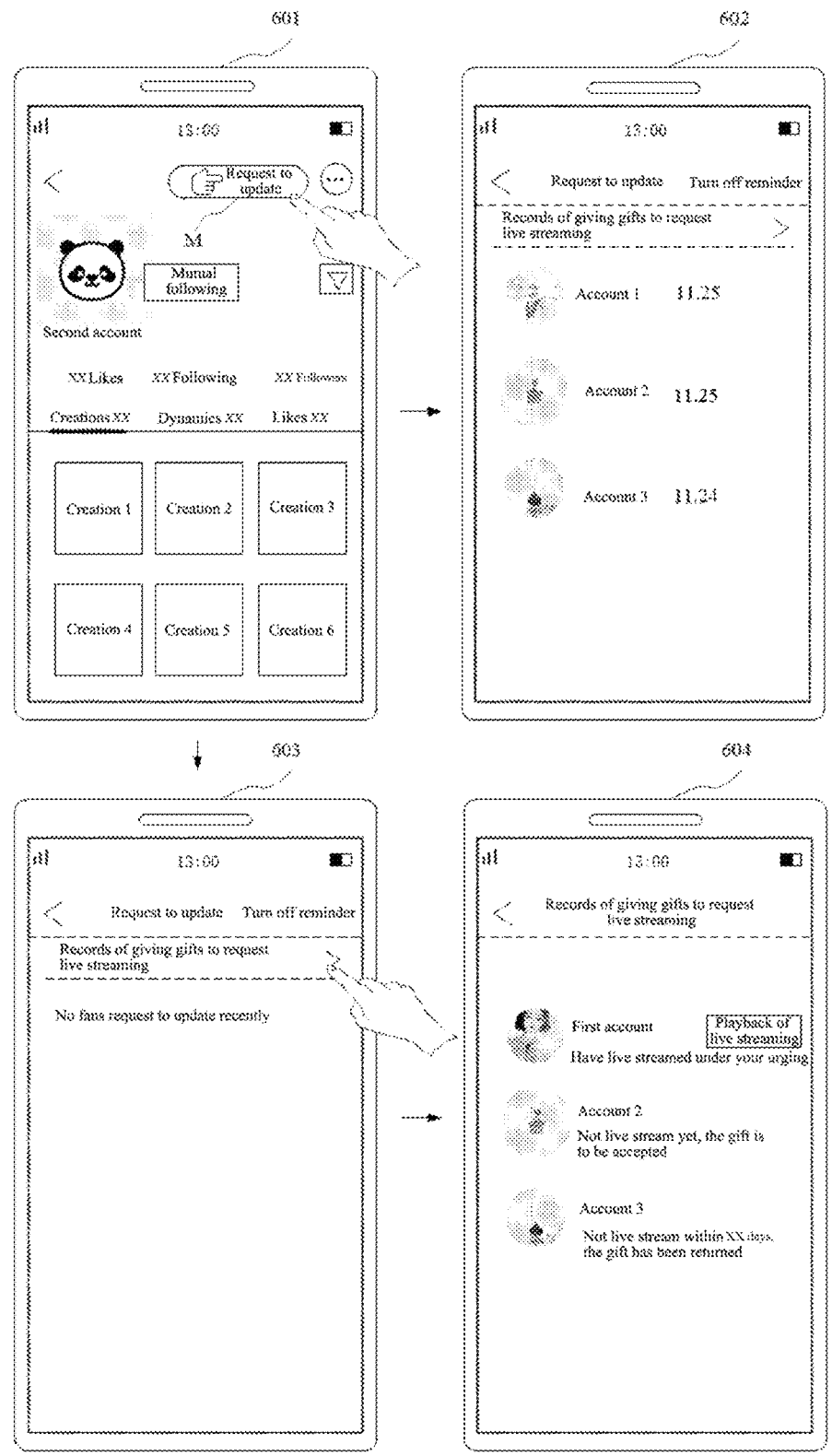
FIG. 6 is a schematic diagram of an interface for viewing urged information provided by an embodiment of the present disclosure.

FIG. 6 is a schematic diagram of an interface for viewing urged information provided by an embodiment of the present disclosure. Please refer to FIG. 6, which includes interfaces 601 to 604.

Please refer to the interface 601. A mobile phone of a user is installed with a live streaming application. The user can log in to the live streaming application with a second account (his/her own account) and operate the mobile phone to cause the mobile phone to display a home page corresponding to the second account (corresponding to the second page). The home page is as shown in the interface 601, and the home page includes a "Request to update" control M (corresponding to the fourth control). When the user needs to see which followers urge him/her to update the creation and which streamers he/she urged to update their creations, the user can click on the "Request to update" control M, and after the mobile phone receives the click operation of the user, the mobile phone displays an update request interface. For example, the mobile phone obtains urged information corresponding to the second account. If the mobile phone receives the urged information corresponding to the second account recently (for example, within one week or one month, etc.), the update request interface is as shown in the interface 602. If the mobile phone does not receive the urged information corresponding to the second account, the update request interface is as shown in the interface 603. In an implementation, if urged information corresponding to the second account is received recently, the amount of the urged information can also be displayed in the "Request to update" control M.

Please refer to the interface 602. If the mobile phone receives the urged information corresponding to the second account recently, the mobile phone displays the urged information in the update request interface, and the urged information includes an urging account and an urging time corresponding to the urging account. According to the urged information displayed in the interface 602, users corresponding to account 1 and account 2 urged the user corresponding to the second account to update the creation on November 25th, and a user corresponding to account 3 urged the user corresponding to the second account to update the creation on November 24th.

Please refer to the interface 603. If the mobile phone does not receive the urged information corresponding to the second account recently, the mobile phone displays prompt information "No followers request to update recently". The update request interface further includes a "Records of giving gifts to request live streaming" control (corresponding to the urging record control), and the user can click the "Records of giving gifts to request live streaming" control to cause the mobile phone to display the records of giving gifts to request live streaming. For details, please refer to the interface 604.

Please refer to the interface 604. The records of giving gifts to request live streaming include multiple urging records, including, for example, urging records of urging the first account, the account 2 and the account 3. The urging record may also include a live streaming status of the other party. For example, if the first account has live streamed, "Have live streamed under your urging" is indicated in the urging record; if the account 2 does not live stream, "Not live stream yet, the gift is to be accepted" is indicated; if the account 3 does not live stream within XX days after urging, "Not live stream within XX days, the virtual resource has been returned" is indicated.

In the above process, the user can easily check whether there are followers urging him/her to update the creation and which streamers he/she urged to update their creations, so as to avoid the user from missing the urging information from followers and improve the reliability of live streaming interaction.

In the present disclosure, after the account of the streamer receives the urging information from followers, in order to facilitate the streamer to view the urging information, the update request information can be determined according to the first prompting information received by the account corresponding to the streamer and the first object, and the update request information can be displayed. Next, a detailed description will be provided through the embodiment shown in FIG. 7.

Figure 7:
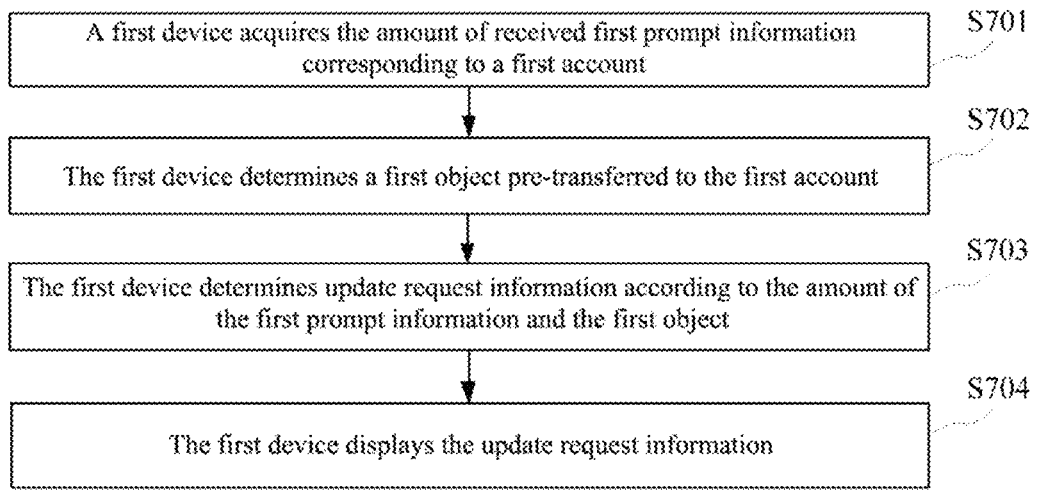
FIG. 7 is a schematic flowchart of another information interaction method provided by an embodiment of the present disclosure.

FIG. 7 is a schematic flowchart of another information interaction method provided by an embodiment of the present disclosure. Please refer to FIG. 7, which includes the following steps.

S701: a first device acquires the amount of received first prompt information corresponding to a first account.

The first device is installed with a live streaming application, and an account for logging in to the live streaming application on the first device is the first account. The first account is an account of a user who uses the first device.

The first prompt information is used to prompt the user corresponding to the first account to update a creation, and the amount of the first prompt information may be the amount of urging that has been received recently (within a preset time period before the current time) to urge the user corresponding to the first account to update the creation. For example, the preset time period may be one week, 10 days before the current time, etc.

When a user urges the user corresponding to the first account to update the creation, a server sends one piece of first prompt information to the first device, and the first device can accumulate the first prompt information received within a preset time period to obtain the amount of the first prompt information.

S702: the first device determines a first object pre-transferred to the first account.

The first object pre-transferred to the first account may be one or more. There may also be no first object pre-transferred to the first account.

When a user pre-transfers the first object to the first account through another account, the first object is first transferred to the server, and the server sends object information of the first object to the first device, where the object information may include an identifier of the first object, the number of virtual resources corresponding to the first object, and so on.

S703: the first device determines update request information according to the amount of the first prompt information and the first object.

The update request information includes the amount of the first prompt information and/or the first object.

When the number of the first objects is greater than or equal to 1, the update request information includes the first object, or the update request information includes the amount of the first prompt information and the first object. The first object included in the update request information may mean that the update request information includes a value attribute corresponding to the first object, for example, the value attribute may be the number of virtual resources corresponding to the first object.

When the number of the first object is 0, the update request information includes the amount of the first prompt information.

S704: the first device displays the update request information.

The first device can acquire a first page corresponding to the first account and display the first page, where the first page includes the update request information. For example, the first device can acquire page information from the server, generate the first page according to the page information, and display the first page, where the page information includes the above update request information. The first page can include an update request control, and the update request control includes the update request information.

In an implementation, when the update request information includes the amount of the first prompt information, after the user performs a click operation on the update request information, first detailed information corresponding to the first prompt information is displayed in response to the click operation on the update request information. The first detailed information includes at least one second account and an urging time of each second account, and the second account is an account urging the user corresponding to the first account to update the creation.

In an implementation, when the update request information includes the first object, after the user performs the click operation on the update request information, second detailed information corresponding to the first object is displayed in response to the click operation on the update request information. The second detailed information includes at least one second account and a time when each second account pre-transfers the first object to the first account, and the second account is an account urging the user corresponding to the first account to update the creation.

After the user corresponding to the first account updates the creation, the user can receive the first objects pre-transferred from other accounts to the first account through the first device. Specifically, the user corresponding to the first account can perform a creation update operation, and the first device displays a creation update page in response to the creation update operation, where the creation update page includes a control of the first object which is pre-transferred. The user can perform a preset operation on the control of the first object to accept the first object. In response to the preset operation on the control of the first object, the first device sends an object transfer request to the server, where the object transfer request is used to request the server to transfer the first object to the first account.

In the embodiment shown in FIG. 7, if there are users corresponding to other accounts who urge the user corresponding to the first account to update the creation, the update request information is displayed on the first page corresponding to the first account, and the user corresponding to the first account can clearly understand a situation of being urged according to the update request information, so that the user corresponding to the first account can update the creation in time, so as to avoid the user corresponding to the first account from missing the urging information from other users, thereby improving the reliability of live streaming interaction.

Next, with reference to FIGS. 8A-8B, the technical solution shown in the embodiment of FIG. 7 will be described in detail through specific examples.

Figure 8A:
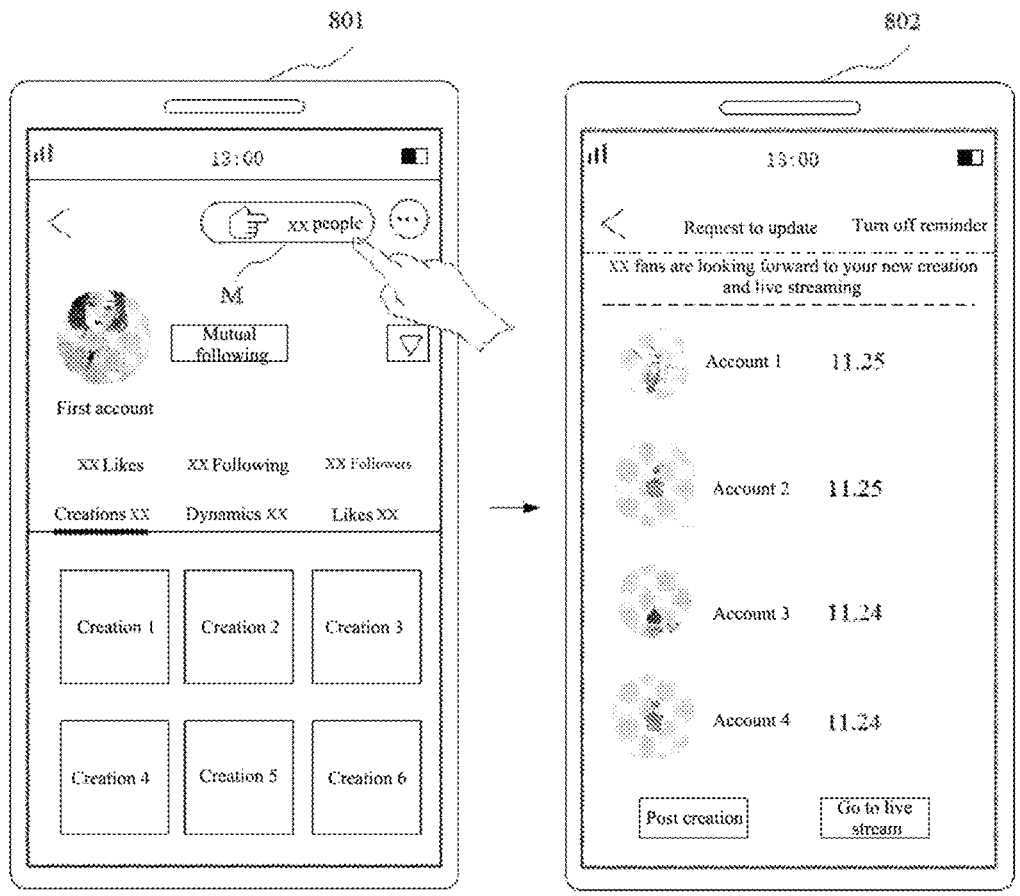
FIG. 8A is a schematic diagram of another interface for viewing urged information provided by an embodiment of the present disclosure.

FIG. 8A is a schematic diagram of another interface for viewing urged information provided by an embodiment of the present disclosure. Please refer to FIG. 8A, which includes an interface 801 and an interface 802.

Please refer to the interface 801. A live streaming application is set up in a mobile phone, and a user can log in to the live streaming application in the mobile phone with a first account, where the first account is the user's own account. The user can operate the mobile phone to cause the mobile phone to display a home page of the live streaming application. The home page includes an update request control, and the update request control includes update request information. Assuming that there is a user who urges the user corresponding to the first account to update the creation (receiving the first prompt information corresponding to the first account), but there is no user who pre-transfers the first object to the first account, the update request information may include the amount of the received first prompt information. Assuming that there are XX users who urge the user corresponding to the first account to update the creation, that is, XX pieces of first prompt information corresponding to the first account are received, then the amount of the first prompt information included in the update request information is XX. The user can perform a click operation on the update request control to see which followers request to update the creation. For details, please refer to the interface 802.

Please refer to the interface 802. The mobile phone displays at least one second account urging the user to update the creation and the urging time of each second account. For example, account 1 and account 2 urged the user to update the creation on November 25th, and account 3 and account 4 urged the user to update the creation on November 24th.

Figure 8B:
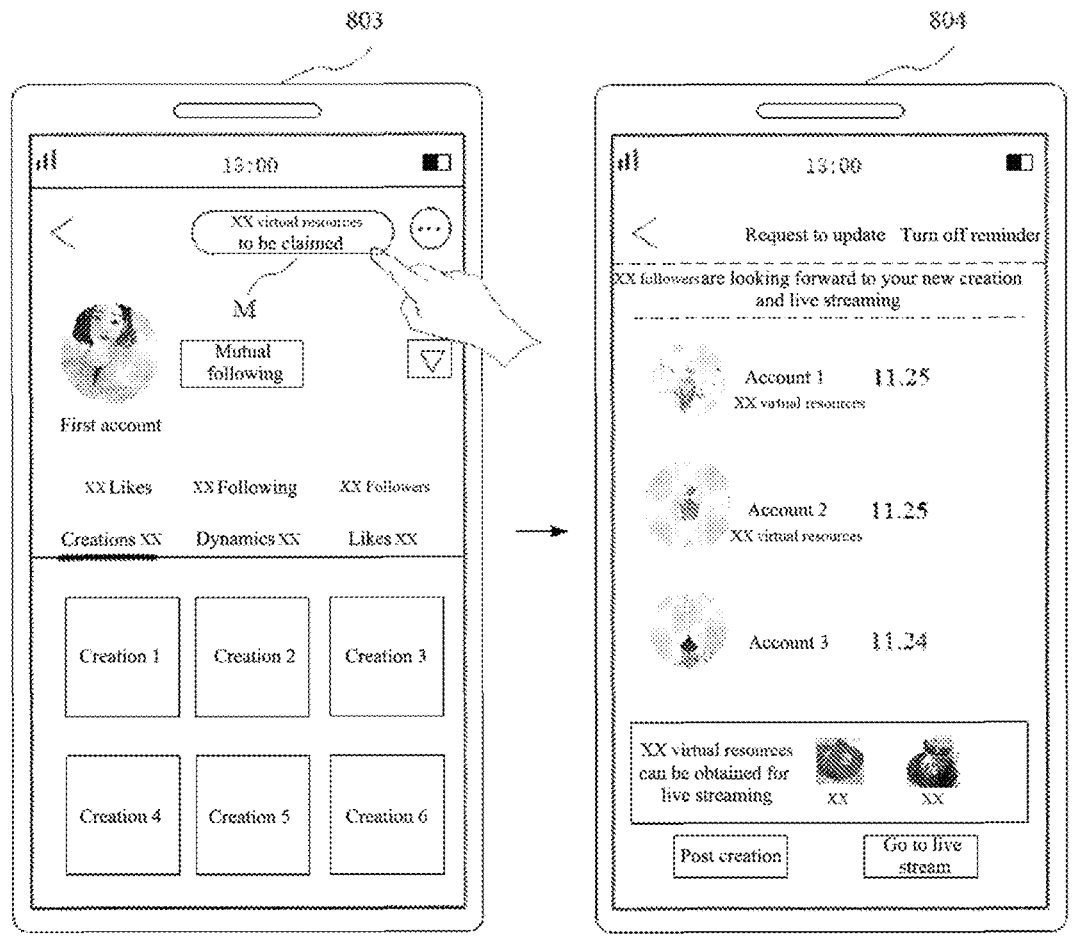
FIG. 8B is a schematic diagram of still another interface for viewing urged information provided by an embodiment of the present disclosure.

FIG. 8B is a schematic diagram of another interface for viewing urged information provided by an embodiment of the present disclosure. Please refer to FIG. 8B, which includes an interface 803 and an interface 804.

Please refer to the interface 803. A live streaming application is set up in a mobile phone, and a user can log in to the live streaming application in the mobile phone with a first account, where the first account is the user's own account. The user can operate the mobile phone to cause the mobile phone to display a home page of the live streaming application. The home page includes an update request control, and the update request control includes update request information. Assuming that there is a user who pre-transfers the first object to the first account, the update request information can include the number of virtual resources. Assuming that a value of the first object pre-transferred by other users to the first account is XX virtual resources, the update request information includes the number of virtual resources, namely, XX. The user can perform a click operation on the update request control to see which followers request to update the creation. For details, please refer to the interface 804.

Please refer to the interface 804. The mobile phone displays at least one second account urging the user to update the creation and the urging time of each second account. The mobile phone also displays the number of virtual resources pre-transferred by other users to the first account. The mobile phone also displays the total amount of virtual resources that can be obtained if the user live streams, for example, "XX virtual resources can be obtained for live streaming" is displayed.

In the above process, if there are followers urging the streamer to update the creation (post a short video or live stream), the update request information is displayed on the home page of the streamer, and the streamer can clearly understand a situation of being urged according to the update request information, so that the streamer can update the creation in time, so as to avoid the streamer from missing urging information from other users, thereby improving the reliability of live streaming interaction.

Figure 9:
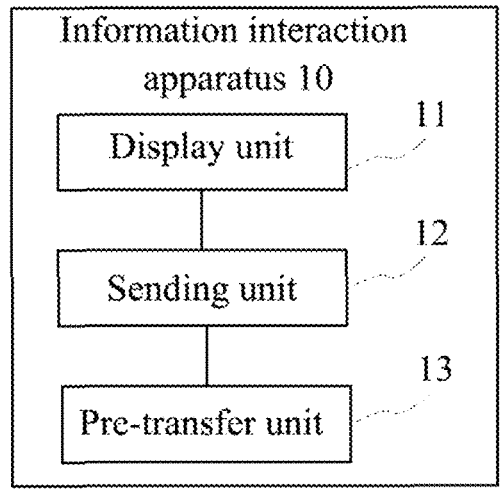
FIG. 9 is a schematic structural diagram of an information interaction apparatus provided by an embodiment of the present disclosure.

FIG. 9 is a schematic structural diagram of an information interaction apparatus provided by an embodiment of the present disclosure. The information interaction apparatus can be arranged in the second device. Referring to FIG. 9, the information interaction apparatus 10 may include a display unit 11, a sending unit 12 and a pre-transfer unit 13, where, the display unit 11 is configured to display a first page corresponding to a first account, where the first page includes a first control;

the sending unit 12 is configured to, in response to a first operation on the first control, send first prompt information to a first device corresponding to the first account, and update the first control to a second control, where the first prompt information is used to prompt a user corresponding to the first account to update a creation;

the pre-transfer unit 13 is configured to, in response to a second operation on the second control, pre-transfer a first object to the first account, where the first object is transferred to the first account after the creation corresponding to the first account is updated.

The information interaction apparatus provided by the embodiments of the present disclosure can execute the technical solutions of the above method embodiments. Implementation principles and technical effects thereof are similar, and will not be repeated in the embodiments here.

In a possible implementation, the display unit 11 is further configured to, in response to a click operation inputted to the second control, display an object detail page, where the object detail page includes an identifier of at least one object and a sending control corresponding to each object;

the pre-transfer unit 13 is specifically configured to, in response to a click operation on a sending control corresponding to the first object, pre-transfer the first object to the first account, where the at least one object includes the first object.

Figure 10:
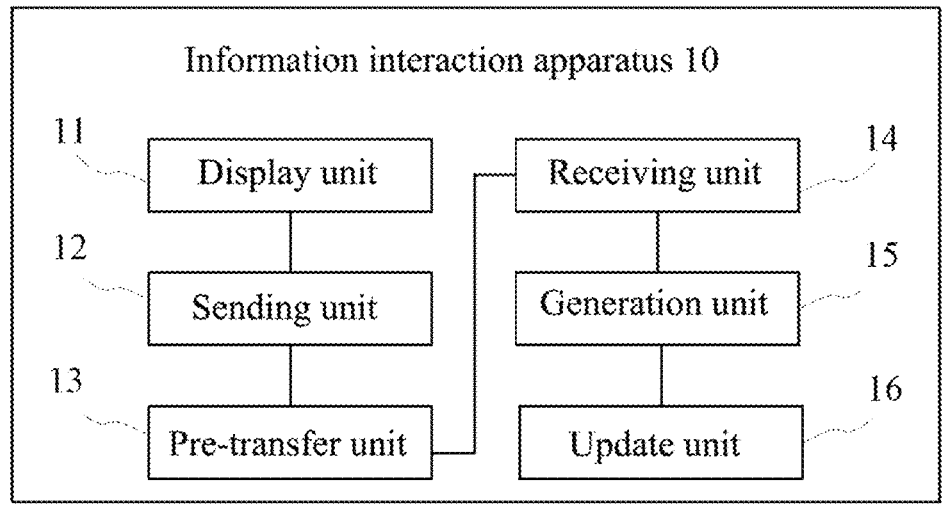
FIG. 10 is a schematic structural diagram of another information interaction apparatus provided by an embodiment of the present disclosure.

FIG. 10 is a schematic structural diagram of another information interaction apparatus provided by an embodiment of the present disclosure. On the basis of the embodiment shown in FIG. 9, referring to FIG. 10, the information interaction apparatus 10 further includes a receiving unit 14 and a generation unit 15, where, the sending unit 12 is further configured to, in response to the click operation inputted to the second control, send an object information acquisition request to a server;

the receiving unit 14 is configured to receive object information sent by the server;

the generation unit 15 is configured to generate the object detail page according to the object information;

the display unit 11 is configured to display the object detail page.

In a possible implementation, the sending unit 12 is further configured to:

in response to the click operation on the sending control corresponding to the first object, send an object transfer request to the server;

where the object transfer request includes an identifier of the first object, and the object transfer request is used to request the server to transfer the first object in a second account to the first account after the creation corresponding to the first account is updated, where the second account is an account which is currently logged in on the second device.

In a possible implementation, the sending unit 12 is specifically configured to:

send an update request to the server, where the update request includes the first account, so that the server sends the first prompt information to the first device according to the first account.

In a possible implementation, the apparatus further includes an update unit 16, where, the update unit 16 is configured to update the second control in the first page to a third control after the pre-transfer unit 13 pre-transfers the first object to the first account, where the third control is used to indicate that the user corresponding to the first account has been successfully urged to update the creation.

In a possible implementation, the receiving unit 14 is further configured to, after the pre-transfer unit 13 pre-transfers the first object to the first account, receive second prompt information after the creation corresponding to the first account is updated;

the display unit 11 is further configured to display the second prompt information, where the second prompt information includes a link of the first account and copywriting information, and the copywriting information is used to indicate that the creation corresponding to the first account is updated under urging from the second account.

In a possible implementation, the display unit 11 is further configured to display a second page corresponding to the second account, where the second page includes a fourth control;

the display unit 11 is further configured to, in response to a click operation on the fourth control, display a third page, where the third page includes urged information, and the urged information includes an urging account and an urging time corresponding to the urging account.

In a possible implementation, the third page further includes an urging record control, and the display unit 11 is further configured to:

in response to a click operation on the urging record control, display records of urging other accounts through the second account.

In a possible implementation, the creation includes a short video and/or a live stream.

The information interaction apparatus provided by the embodiments of the present disclosure can execute the technical solutions of the above method embodiments. Implementation principles and technical effects thereof are similar, and will not be repeated in the embodiments here.

Figure 11:
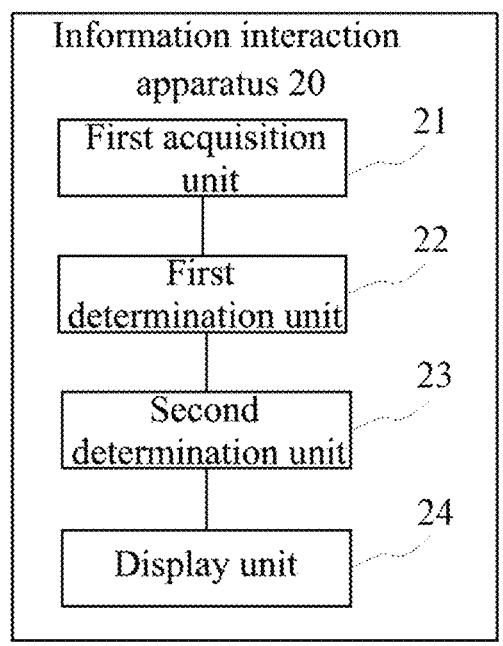
FIG. 11 is a schematic structural diagram of still another information interaction apparatus provided by an embodiment of the present disclosure.

FIG. 11 is a schematic structural diagram of still another information interaction apparatus provided by an embodiment of the present disclosure. The information interaction apparatus 20 can be arranged in the first device. Referring to FIG. 11, the information interaction apparatus 20 may include a first acquisition unit 21, a first determination unit 22, a second determination unit 23 and a display unit 24, where, the first acquisition unit 21 is configured to acquire the amount of received first prompt information corresponding to a first account, where the first prompt information is used to prompt a user corresponding to the first account to update a creation;

the first determination unit 22 is configured to determine a first object pre-transferred to the first account;

the second determination unit 23 is configured to determine update request information according to the amount of the first prompt information and the first object, where the update request information includes the amount of the first prompt information and/or the first object;

the display unit 24 is used to display the update request information.

The information interaction apparatus provided by the embodiments of the present disclosure can execute the technical solutions of the above method embodiments. Implementation principles and technical effects thereof are similar, and will not be repeated in the embodiments here.

Figure 12:
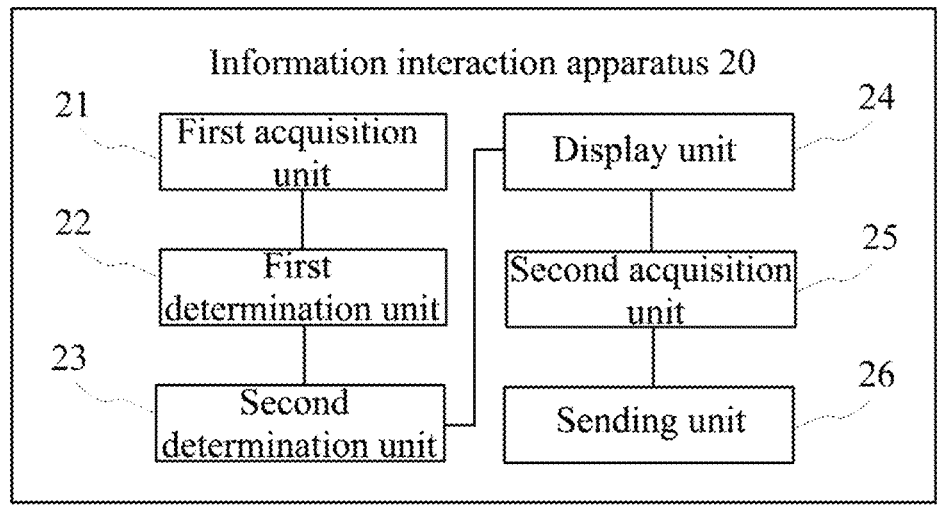
FIG. 12 is a schematic structural diagram of yet another information interaction apparatus provided by an embodiment of the present disclosure.

FIG. 12 is a schematic structural diagram of yet another information interaction apparatus provided by an embodiment of the present disclosure. On the basis of the embodiment shown in FIG. 11, referring to FIG. 12, the information interaction apparatus 20 further includes a second acquisition unit 25, where, the second acquisition unit 25 is configured to acquire a first page corresponding to the first account, where the first page includes the update request information;

the display unit 24 is configured to display the first page.

In a possible implementation, the number of the first object is greater than or equal to 1, and the update request information includes the first object, or the update request information includes the amount of the first prompt information and the first object; or, the number of the first objects is 0, and the update request information includes the amount of the first prompt information.

In a possible implementation, the update request information includes the amount of the first prompt information; the display unit 24 is further configured to:

in response to a click operation on the update request information, display first detailed information corresponding to the first prompt information;

where the first detailed information includes at least one second account and an urging time of each second account, and the second account is an account urging the user corresponding to the first account to update the creation.

In a possible implementation, the update request information includes the first object; the display unit 24 is further configured to:

in response to a click operation on the update request information, display second detailed information corresponding to the first object;

where the second detailed information includes at least one second account and a time when each second account pre-transfers the first object to the first account, and the second account is an account urging the user corresponding to the first account to update the creation.

In a possible implementation, the information interaction apparatus 20 further includes a sending unit 26, where, the display unit 24 is further configured to, in response to a creation update operation, display a creation update page, where the creation update page includes a control of the first object which is pre-transferred;

the sending unit 26 is configured to, in response to a preset operation on the control of the first object, send an object transfer request to a server, where the object transfer request is used to request the server to transfer the first object to the first account.

The information interaction apparatus provided by the embodiments of the present disclosure can execute the technical solutions of the above method embodiments. Implementation principles and technical effects thereof are similar, and will not be repeated in the embodiments here.

Figure 13:
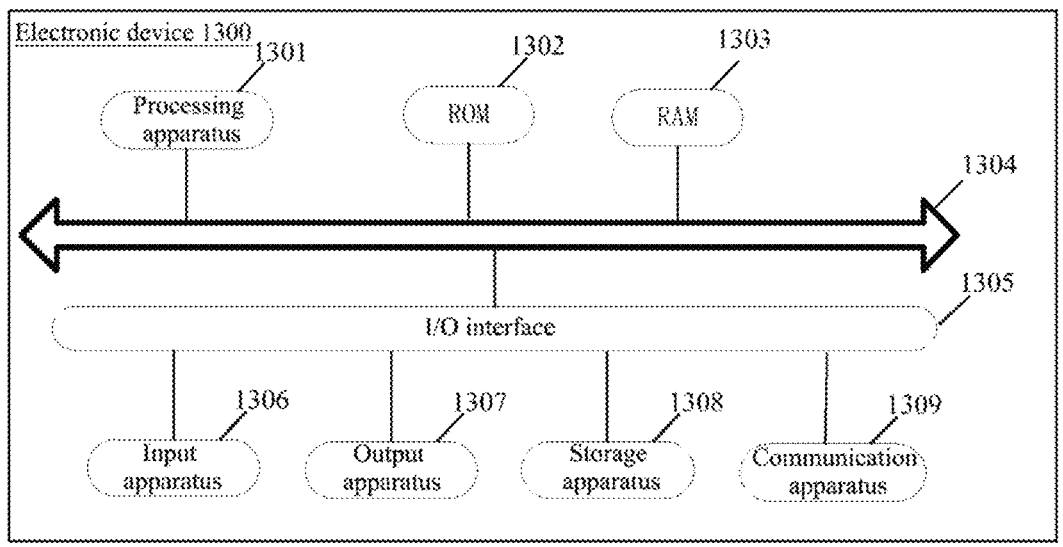
FIG. 13 is a schematic structural diagram of an electronic device according to an embodiment of the present disclosure.

Please refer to FIG. 13, which shows a schematic structural diagram of an electronic device 1300 suitable for implementing the embodiments of the present disclosure. The electronic device 1300 may be a terminal device or a server. The terminal device may include, but is not limited to, a mobile terminal such as a mobile phone, a laptop, a digital broadcast receiver, a personal digital assistant (PDA), a portable android device (PAD), a portable media player (PMP), a vehicle-mounted terminal (for example, a vehicle navigation terminal), etc., and a fixed terminal such as a digital television (TV), a desktop computer, etc. The electronic device shown in FIG. 13 is only an example, and should not bring any limitation to the functions and scope of use of the embodiments of the present disclosure.

As shown in FIG. 13, the electronic device 1300 may include a processing apparatus (such as a central processing unit, a graphics processor, etc.) 1301, which can perform various appropriate actions and processing according to a program stored in a read only memory (ROM) 1302 or a program loaded from a storage apparatus 1308 into a random access memory (RAM) 1303. In the RAM 1303, various programs and data required for operations of the electronic device 1300 are also stored. The processing apparatus 1301, the ROM 1302 and the RAM 1303 are connected to each other through a bus 1304. An input/output I/O) interface 1305 is also connected to the bus 1304.

Generally, the following apparatuses can be connected to the I/O interface 1305: an input apparatus 1306 including, for example, a touch screen, a touch panel, a keyboard, a mouse, a camera, a microphone, an accelerometer, a gyroscope, etc.; an output apparatus 1307 including, for example, a liquid crystal display (LCD), a speaker, a vibrator, etc.; the storage apparatus 1308 including, for example, a magnetic tape, a hard disk, etc.; and a communication apparatus 1309. The communication apparatus 1309 can allow the electronic device 1300 to perform wireless or wired communication with other devices to exchange data. Although FIG. 13 shows the electronic device 1300 having various apparatuses, it should be understood that it is not required to implement or have all of the illustrated apparatuses. More or fewer apparatuses may alternatively be implemented or provided.

In particular, according to an embodiment of the present disclosure, a process described above with reference to a flowchart can be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from a network through the communication apparatus 1309, or installed from the storage apparatus 1308, or installed from the ROM 1302. When the computer program is executed by the processing apparatus 1301, the above functions defined in the methods of the embodiments of the present disclosure are executed.

It should be noted that the above computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared or semiconductor system, apparatus or device, or a combination of any of the above. More specific examples of the computer-readable storage medium may include, but are not limited to: an electrical connection with one or more wires, a portable computer disk, a hard disk, a random access memory (RAM), a read only memory (ROM), an erasable programmable read only memory (EPROM or flash memory), an optical fiber, a portable compact disk-read only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus or device. In the present disclosure, the computer-readable signal medium may include a data signal propagated in a baseband or as a part of a carrier wave, and computer-readable program code is carried therein. Such propagated data signal can take many forms, including but not limited to an electromagnetic signal, an optical signal, or any suitable combination of the above. The computer-readable signal medium may also be any computer-readable medium other than the computer-readable storage medium. The computer-readable signal medium can send, propagate, or transmit the program for use by or in combination with the instruction execution system, apparatus, or device. The program code contained on the computer-readable medium can be transmitted using any suitable medium, including but not limited to: an electric wire, an optical cable, a radio frequency (RF) or the like, or any suitable combination of the above.

The above computer-readable medium may be included in the above electronic device; or may exist alone without being assembled into the electronic device.

The above computer-readable medium carries one or more programs, and when the above one or more programs are executed by the electronic device, the electronic device is caused to execute the methods shown in the above embodiments.

The computer program code used to perform the operations of the present disclosure may be written in one or more programming languages or a combination thereof. The above programming languages include object-oriented programming languages such as Java, Smalltalk, C++, and also conventional procedural programming languages such as "C" language or similar programming languages. The program code can be executed entirely on a user computer, executed partly on the user computer, executed as an independent software package, executed partly on the user computer and partly on a remote computer, or executed entirely on the remote computer or server. In the case involving the remote computer, the remote computer can be connected to the user computer through any kind of networks, including a local area network (LAN) or a wide area network (WAN), or can be connected to an outside computer (for example, being connected via the Internet using an Internet service provider).

The flowcharts and block diagrams in the accompanying drawings illustrate possible implementation architectures, functions and operations of the systems, methods and computer program products according to various embodiments of the present disclosure. In this regard, each block in the flowcharts or block diagrams may represent a module, a program segment, or a part of code, and the module, the program segment, or the part of code contains one or more executable instructions for implementing the specified logic function. It should also be noted that, in some alternative implementations, the functions marked in the blocks may also occur in a different order from the order marked in the drawings. For example, two blocks shown in succession may actually be executed substantially in parallel, and they may sometimes be executed in the reverse order, depending on the functions involved. It should also be noted that each block in the block diagrams and/or flowcharts, and the combination of the blocks in the block diagrams and/or flowcharts, can be implemented by a dedicated hardware-based system that performs the specified functions or operations, or can be implemented by a combination of dedicated hardware and computer instructions.

The units involved in the embodiments described in the present disclosure can be implemented in software or hardware. The name of the unit does not constitute a limitation on the unit itself under certain circumstances. For example, the first acquisition unit can also be described as "a unit for acquiring at least two internet protocol addresses".

The functions described above may be performed at least in part by one or more hardware logic components. For example, without limitation, exemplary types of hardware logic components that can be used include: a field programmable gate array (FPGA), an application specific integrated circuit (ASIC), an application specific standard part (ASSP), a system on chip (SOC), a complex programmable logic device (CPLD), etc.

In the context of the present disclosure, a machine-readable medium may be a tangible medium, which may contain or store a program for use by or in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the above. More specific examples of the machine-readable storage medium would include an electrical connection based on one or more wires, a portable computer disk, a hard disk, a random access memory (RAM), a read only memory (ROM), an erasable programmable read only memory (EPROM or flash memory), an optical fiber, a compact disk-read only memory (CD-ROM), an optical storage device, a magnetic storage device, or any suitable combination of the above.

In a first aspect, according to one or more embodiments of the present disclosure, there is provided an information interaction method, including:

displaying, by a second device, a first page corresponding to a first account, where the first page includes a first control;

in response to a first operation on the first control, sending, by the second device, first prompt information to a first device corresponding to the first account, and updating the first control to a second control, where the first prompt information is used to prompt a user corresponding to the first account to update a creation;

in response to a second operation on the second control, pre-transferring, by the second device, a first object to the first account, where the first object is transferred to the first account after the creation corresponding to the first account is updated.

According to one or more embodiments of the present disclosure, in response to the second operation on the second control, pre-transferring, by the second device, the first object to the first account includes: in response to a click operation inputted to the second control, displaying, by the second device, an object detail page, where the object detail page includes an identifier of at least one object and a sending control corresponding to each object; in response to a click operation on a sending control corresponding to the first object, pre-transferring, by the second device, the first object to the first account, where the at least one object includes the first object.

According to one or more embodiments of the present disclosure, in response to the click operation inputted to the second control, displaying, by the second device, the object detail page includes: in response to the click operation inputted to the second control, sending, by the second device, an object information acquisition request to a server; receiving, by the second device, object information sent by the server; generating, by the second device, the object detail page according to the object information and displaying the object detail page.

According to one or more embodiments of the present disclosure, in response to the click operation on the sending control corresponding to the first object, pre-transferring, by the second device, the first object to the first account includes: in response to the click operation on the sending control corresponding to the first object, sending, by the second device, an object transfer request to the server; where the object transfer request includes an identifier of the first object, and the object transfer request is used to request the server to transfer the first object in a second account to the first account after the creation corresponding to the first account is updated, where the second account is an account which is currently logged in on the second device.

According to one or more embodiments of the present disclosure, sending, by the second device, the first prompt information to the first device corresponding to the first account includes: sending, by the second device, an update request to the server, where the update request includes the first account, so that the server sends the first prompt information to the first device according to the first account.

According to one or more embodiments of the present disclosure, after pre-transferring, by the second device, the first object to the first account, the method further includes:

updating, by the second device, the second control in the first page to a third control, where the third control is used to indicate that the user corresponding to the first account has been successfully urged to update the creation.

According to one or more embodiments of the present disclosure, after pre-transferring, by the second device, the first object to the first account, the method further includes: receiving and displaying, by the second device, second prompt information after the creation corresponding to the first account is updated, where the second prompt information includes a link of the first account and copywriting information, and the copywriting information is used to indicate that the creation corresponding to the first account is updated under urging corresponding to the second account.

According to one or more embodiments of the present disclosure, the method further includes: displaying, by the second device, a second page corresponding to the second account, where the second page includes a fourth control; in response to a click operation on the fourth control, displaying, by the second device, a third page, where the third page includes urged information, and the urged information includes an urging account and an urging time corresponding to the urging account.

According to one or more embodiments of the present disclosure, the third page further includes an urging record control, and the method further includes: in response to a click operation on the urging record control, displaying records of urging other accounts through the second account.

According to one or more embodiments of the present disclosure, the creation includes a short video and/or a live stream.

In a second aspect, according to one or more embodiments of the present disclosure, there is provided an information interaction method, including:

acquiring, by a first device, the amount of received first prompt information corresponding to a first account, where the first prompt information is used to prompt a user corresponding to the first account to update a creation;

determining, by the first device, a first object pre-transferred to the first account;

determining, by the first device, update request information according to the amount of the first prompt information and the first object, where the update request information includes the amount of the first prompt information and/or the first object;

displaying, by the first device, the update request information.

According to one or more embodiments of the present disclosure, displaying, by the first device, the update request information includes: acquiring, by the first device, a first page corresponding to the first account, where the first page includes the update request information; displaying, by the first device, the first page.

According to one or more embodiments of the present disclosure, the number of the first object is greater than or equal to 1, and the update request information includes the first object, or the update request information includes the amount of the first prompt information and the first object; or, the number of the first object is 0, and the update request information includes the amount of the first prompt information.

According to one or more embodiments of the present disclosure, the update request information includes the amount of the first prompt information, and the method further includes: in response to a click operation on the update request information, displaying first detailed information corresponding to the first prompt information; where the first detailed information includes at least one second account and an urging time of each second account, and the second account is an account urging the user corresponding to the first account to update the creation.

According to one or more embodiments of the present disclosure, the update request information includes the first object, and the method further includes: in response to a click operation on the update request information, displaying second detailed information corresponding to the first object; where the second detailed information includes at least one second account and a time when each second account pre-transfers the first object to the first account, and the second account is an account urging the user corresponding to the first account to update the creation.

According to one or more embodiments of the present disclosure, the method further includes: in response to a creation update operation, displaying, by the first device, a creation update page, where the creation update page includes a control of the first object which is pre-transferred; in response to a preset operation on the control of the first object, sending, by the first device, an object transfer request to the server, where the object transfer request is used to request the server to transfer the first object to the first account.

In a third aspect, according to one or more embodiments of the present disclosure, there is provided an information interaction apparatus, and the information interaction apparatus includes a display unit, a sending unit and a pre-transfer unit, where, the display unit is configured to display a first page corresponding to a first account, where the first page includes a first control;

the sending unit is configured to, in response to a first operation on the first control, send first prompt information to a first device corresponding to the first account, and update the first control to a second control, where the first prompt information is used to prompt a user corresponding to the first account to update a creation;

the pre-transfer unit is configured to, in response to a second operation on the second control, pre-transfer a first object to the first account, where the first object is transferred to the first account after the creation corresponding to the first account is updated.

According to one or more embodiments of the present disclosure, the display unit is further configured to, in response to a click operation inputted to the second control, display an object detail page, where the object detail page includes an identifier of at least one object and a sending control corresponding to each object; the pre-transfer unit is specifically configured to, in response to a click operation on a sending control corresponding to the first object, pre-transfer the first object to the first account, where the at least one object includes the first object.

According to one or more embodiments of the present disclosure, the apparatus further includes a receiving unit and a generation unit, where the sending unit is further configured to, in response to the click operation inputted to the second control, send an object information acquisition request to a server; the receiving unit is configured to receive object information sent by the server; the generation unit is configured to generate the object detail page according to the object information; the display unit is configured to display the object detail page.

According to one or more embodiments of the present disclosure, the sending unit is further configured to, in response to the click operation on the sending control corresponding to the first object, send an object transfer request to the server; where the object transfer request includes an identifier of the first object, and the object transfer request is used to request the server to transfer the first object in a second account to the first account after the creation corresponding to the first account is updated, where the second account is an account which is currently logged in on the second device.

According to one or more embodiments of the present disclosure, the sending unit is specifically configured to send an update request to the server, where the update request includes the first account, so that the server sends the first prompt information to the first device according to the first account.

According to one or more embodiments of the present disclosure, the apparatus further includes an update unit, where the update unit is configured to update the second control in the first page to a third control after the pre-transfer unit pre-transfers the first object to the first account, where the third control is used to indicate that the user corresponding to the first account has been successfully urged to update the creation.

According to one or more embodiments of the present disclosure, the receiving unit is further configured to, after the pre-transfer unit pre-transfers the first object to the first account, receive second prompt information after the creation corresponding to the first account is updated; the display unit is further configured to display the second prompt information, where the second prompt information includes a link of the first account and copywriting information, and the copywriting information is used to indicate that the creation corresponding to the first account is updated under urging corresponding to the second account.

According to one or more embodiments of the present disclosure, the display unit is further configured to display a second page corresponding to the second account, where the second page includes a fourth control; the display unit is further configured to, in response to a click operation on the fourth control, display a third page, where the third page includes urged information, and the urged information includes an urging account and an urging time corresponding to the urging account.

According to one or more embodiments of the present disclosure, the third page further includes an urging record control, and the display unit is further configured to: in response to a click operation on the urging record control, display records of urging other accounts through the second account.

According to one or more embodiments of the present disclosure, the creation includes a short video and/or a live stream.

In a fourth aspect, according to one or more embodiments of the present disclosure, there is provided an information interaction apparatus including a first acquisition unit, a first determination unit, a second determination unit and a display unit, where,
  the first acquisition unit is configured to acquire the amount of received first prompt information corresponding to a first account, where the first prompt information is used to prompt a user corresponding to the first account to update a creation;
  the first determination unit is configured to determine a first object pre-transferred to the first account;
  the second determination unit is configured to determine update request information according to the amount of the first prompt information and the first object, where the update request information includes the amount of the first prompt information and/or the first object;
  the display unit is used to display the update request information.

According to one or more embodiments of the present disclosure, the apparatus further includes a second acquisition unit, where,
  the second acquisition unit is configured to acquire a first page corresponding to the first account, where the first page includes the update request information;
  the display unit is configured to display the first page.

According to one or more embodiments of the present disclosure, the number of the first object is greater than or equal to 1, and the update request information includes the first object, or the update request information includes the amount of the first prompt information and the first object; or, the number of the first object is 0, the update request information includes the amount of the first prompt information.

According to one or more embodiments of the present disclosure, the update request information includes the amount of the first prompt information; the display unit is further configured to: in response to a click operation on the update request information, display first detailed information corresponding to the first prompt information; where the first detailed information includes at least one second account and an urging time of each second account, and the second account is an account urging the user corresponding to the first account to update the creation.

According to one or more embodiments of the present disclosure, the update request information includes the first object; the display unit is further configured to: in response to a click operation on the update request information, display second detailed information corresponding to the first object; where the second detailed information includes at least one second account and a time when each second account pre-transfers the first object to the first account, and the second account is an account urging the user corresponding to the first account to update the creation.

According to one or more embodiments of the present disclosure, the apparatus further includes a sending unit, where the display unit is further configured to, in response to a creation update operation, display a creation update page, where the creation update page includes a control of the first object which is pre-transferred; the sending unit is configured to, in response to a preset operation on the control of the first object, send an object transfer request to a server, where the object transfer request is used to request the server to transfer the first object to the first account.

In a fifth aspect, according to one or more embodiments of the present disclosure, there is provided an electronic device, including at least one processor and a memory;
  the memory stores computer execution instructions;
  the at least one processor executes the computer execution instructions stored in the memory to cause the at least one processor to execute the information interaction method according to the first aspect and various possible designs of the first aspect.

In a sixth aspect, according to one or more embodiments of the present disclosure, there is provided an electronic device, including at least one processor and a memory;
  the memory stores computer execution instructions;
  the at least one processor executes the computer execution instructions stored in the memory to cause the at least one processor to execute the information interaction method according to the second aspect and various possible designs of the second aspect.

In a seventh aspect, according to one or more embodiments of the present disclosure, there is provided a computer-readable storage medium, where the computer-readable storage medium stores computer execution instructions, and when the computer execution instructions are executed by a processor, the information interaction method according to the first aspect and various possible designs of the first aspect.

In an eighth aspect, according to one or more embodiments of the present disclosure, there is provided a computer-readable storage medium, where the computer-readable storage medium stores computer execution instructions, and when the computer execution instructions are executed by a processor, the information interaction method according to the second aspect and various possible designs of the second aspect.

In a ninth aspect, an embodiment of the present disclosure provides a computer program product including a computer program, where the information interaction method according to the first aspect and various possible designs of the first aspect is implemented when the computer program is executed by a processor.

In a tenth aspect, an embodiment of the present disclosure provides a computer program product including a computer program, where the information interaction method according to the second aspect and various possible designs of the second aspect is implemented when the computer program is executed by a processor.

In an eleventh aspect, an embodiment of the present disclosure provides a computer program, where the information interaction method according to the first aspect and various possible designs of the first aspect is implemented when the computer program is executed by a processor.

In a twelfth aspect, an embodiment of the present disclosure provides a computer program, where the information interaction method according to the second aspect and various possible designs of the second aspect is implemented when the computer program is executed by a processor.

The above description is only preferred embodiments of the present disclosure and an explanation of the applied technical principles. Those skilled in the art should understand that the scope of disclosure involved in this disclosure is not limited to the technical solutions formed by the specific combinations of the above technical features, and should also cover other technical solutions formed by the arbitrary combinations of the above technical features or their equivalent features without departing from the above disclosed concept, for example, a technical solution formed by replacing the above features and the technical features disclosed in the present disclosure having similar functions (but not limited thereto) with each other.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combinations.

Although the subject matter has been described in language specific to structural features and/or logical actions of the methods, it should be understood that the subject matter defined in the claims is not necessarily limited to the specific features or actions described above. On the contrary, the specific features and actions described above are merely exemplary forms of implementing the claims.

The invention claimed is:

1. An information interaction method, comprising:
displaying, by a second device, a first page corresponding to a first account, wherein the first page comprises a first control;
in response to a first operation on the first control, sending, by the second device, first prompt information to a first device corresponding to the first account, and displaying a second control, wherein the first prompt information is used to prompt a streamer corresponding to the first account to go live, wherein going live comprises starting a live stream; and
in response to a second operation on the second control, pre-transferring, by the second device, a first object to the first account, wherein the first object is transferred to the first account after the streamer corresponding to the first account goes live,
wherein, in response to the second operation on the second control, pre-transferring, by the second device, the first object to the first account comprises:
in response to the second operation on the second control, sending, by the second device, an object transfer request to a server,
wherein the object transfer request is used to request the server to transfer the first object corresponding to a second account to the first account after the streamer corresponding to the first account goes live,
wherein the second account is an account which is currently logged in on the second device.

2. The method according to claim 1, wherein in response to the second operation on the second control, sending, by the second device, the object transfer request to the server comprises:
in response to a click operation inputted to the second control, displaying, by the second device, an object detail page, wherein the object detail page comprises an identifier of at least one object and a sending control corresponding to each object; and
in response to a click operation on a sending control corresponding to the first object, sending, by the second device, the first-object transfer request to the server, wherein the at least one object comprises the first object.

3. The method according to claim 2, wherein in response to the click operation inputted to the second control, displaying, by the second device, the object detail page comprises:
in response to the click operation inputted to the second control, sending, by the second device, an object information acquisition request to the server;
receiving, by the second device, object information sent by the server;
generating, by the second device, the object detail page according to the object information and displaying the object detail page.

4. The method according to claim 1, wherein sending, by the second device, the first prompt information to the first device corresponding to the first account comprises:

sending, by the second device, a go-live prompt request to the server, wherein the go-live prompt request comprises the first account, so that the server sends the first prompt information to the first device according to the first account.

5. The method according to claim 1, wherein after pre-transferring, by the second device, the first object to the first account, the method further comprises:

displaying, by the second device, a third control, wherein the third control is used to indicate that the streamer corresponding to the first account has been successfully urged to go live.

6. The method according to claim 1, wherein after pre-transferring, by the second device, the first object to the first account, the method further comprises:

receiving and displaying, by the second device, second prompt information after the streamer corresponding to the first account goes live, wherein the second prompt information comprises a link of the first account and copywriting information, and the copywriting information is used to indicate that the streamer corresponding to the first account goes live under urging corresponding to the second account.

7. The method according to claim 1, wherein the method further comprises:

displaying, by the second device, a second page corresponding to the second account, wherein the second page comprises a fourth control;

in response to a click operation on the fourth control, displaying, by the second device, a third page, wherein the third page comprises urged information, and the urged information comprises an urging account and an urging time corresponding to the urging account.

8. The method according to claim 7, wherein the third page further comprises an urging record control, and the method further comprises:

in response to a click operation on the urging record control, displaying records of urging other accounts through the second account.

9. A non-transitory computer-readable storage medium, wherein the computer-readable storage medium stores computer execution instructions, and when a processor executes the computer execution instructions, the information interaction method according to claim 1 is implemented.

10. An information interaction method, comprising:

acquiring, by a first device, an amount of received first prompt information corresponding to a first account, wherein the first prompt information is used to prompt a streamer corresponding to the first account to go live, wherein going live comprises starting a live stream;

determining, by the first device, a first object pre-transferred to the first account;

determining, by the first device, go-live prompt information according to the amount of the first prompt information and the first object, wherein the go-live prompt information comprises the amount of the first prompt information and/or the first object;

displaying, by the first device, the go-live prompt information;

in response to a go-live operation, displaying, by the first device, a go-live page, wherein the go-live page comprises a control of the first object which is pre-transferred; and in response to a preset operation on the control of the first object, sending, by the first device, an object transfer request to a server, wherein the object transfer request is used to request the server to transfer the first object to the first account after the streamer corresponding to the first account goes live.

11. The method according to claim 10, wherein displaying, by the first device, the go-live prompt information comprises:

acquiring, by the first device, a first page corresponding to the first account, wherein the first page comprises the go-live prompt information;

displaying, by the first device, the first page.

12. The method according to claim 10, wherein, upon determining that the number of the first object is greater than or equal to 1, the go-live prompt information comprises the first object, or the go-live prompt information comprises the amount of the first prompt information and the first object; or, upon determining that the number of the first object is 0, the go-live prompt information comprises the amount of the first prompt information.

13. The method according to claim 10, wherein the go-live prompt information comprises the amount of the first prompt information, and the method further comprises:

in response to a click operation on the go-live prompt information, displaying first detailed information corresponding to the first prompt information;

wherein the first detailed information comprises at least one second account and an urging time of each second account, and the second account is an account urging the streamer corresponding to the first account to go live.

14. The method according to claim 11, wherein the go-live prompt information comprises the first object, and the method further comprises:

in response to a click operation on the go-live prompt information, displaying second detailed information corresponding to the first object;

wherein the second detailed information comprises at least one second account and a time when each second account pre-transfers the first object to the first account, and the second account is an account urging the streamer corresponding to the first account to go live.

15. An electronic device, comprising: at least one processor and a memory;

the memory stores computer execution instructions;

the at least one processor executes the computer execution instructions stored in the memory to cause the at least one processor to execute the information interaction method according to claim 10.

16. A non-transitory computer-readable storage medium, wherein the computer-readable storage medium stores computer execution instructions, and when a processor executes the computer execution instructions, the information interaction method according to claim 10 is implemented.

17. An electronic device, comprising:

at least one processor and a memory;

the memory stores computer execution instructions;

the at least one processor executes the computer execution instructions stored in the memory to cause the at least one processor to execute the following operations:

displaying a first page corresponding to a first account, wherein the first page comprises a first control;

in response to a first operation on the first control, sending first prompt information to a first device corresponding to the first account, and displaying a second control, wherein the first prompt information is used to prompt a streamer corresponding to the first account to go live, wherein going live comprises starting a live stream; and in response to a second operation on the second control, pre-transferring a first object to the first account, wherein the first object is transferred to the first account after the streamer corresponding to the first account goes live, wherein, in response to the second operation on the second control, pre-transferring, by a second device, the first object to the first account comprises:

in response to the second operation on the second control, sending, by the second device, an object transfer request to a server, wherein the object transfer request is used to request the server to transfer the first object corresponding to a second account to the first account after the streamer corresponding to the first account goes live, and wherein the second account is an account which is currently logged in on the second device.

* * * * *